United States Patent
Kuosmanen et al.

(10) Patent No.: US 12,226,839 B2
(45) Date of Patent: Feb. 18, 2025

(54) ARRANGEMENT FOR PROVIDING CENTRE DISPLACEMENT IN A MACHINE TOOL

(71) Applicant: Aalto University Foundation sr, Aalto (FI)

(72) Inventors: Petri Kuosmanen, Aalto (FI); Raine Viitala, Aalto (FI); Valtteri Vainio, Aalto (FI)

(73) Assignee: Aalto University Foundation sr, Aalto (FI)

( * ) Notice: Subject to any disclaimer, the term of this patent is extended or adjusted under 35 U.S.C. 154(b) by 784 days.

(21) Appl. No.: 17/606,142

(22) PCT Filed: Apr. 24, 2020

(86) PCT No.: PCT/FI2020/050270
§ 371 (c)(1),
(2) Date: Oct. 25, 2021

(87) PCT Pub. No.: WO2020/216997
PCT Pub. Date: Oct. 29, 2020

(65) Prior Publication Data
US 2022/0152711 A1 May 19, 2022

(30) Foreign Application Priority Data

Apr. 24, 2019 (FI) .................................... 20190029

(51) Int. Cl.
*B23B 31/36* (2006.01)
*B23B 31/02* (2006.01)

(52) U.S. Cl.
CPC .......... *B23B 31/36* (2013.01); *B23B 31/0261* (2021.01); *Y10T 279/14* (2015.01)

(58) Field of Classification Search
CPC . B23B 31/36; B23B 31/0261; B23B 2231/22; B23B 31/026; Y10T 279/14; Y10T 279/25

See application file for complete search history.

(56) References Cited

U.S. PATENT DOCUMENTS 1,463,686 A * 7/1923 Frey .................. B23B 29/03403
279/6
2,290,341 A * 7/1942 Bigmore ................ B23Q 27/00
279/6

(Continued)

FOREIGN PATENT DOCUMENTS

BE 398942 10/1933
CN 108687556 10/2018

(Continued)

OTHER PUBLICATIONS

PCT International Search Report for PCT Application No. PCT/FI2020/050270 mailed Aug. 17, 2020 (3 pages).

(Continued)

*Primary Examiner* — Eric A. Gates
*Assistant Examiner* — Reinaldo A Vargas Del Rio
(74) *Attorney, Agent, or Firm* — Merchant & Gould P.C.

(57) ABSTRACT

Fastening an object onto a lathe, such that the location of the centre of rotation of the object may be adjusted relative to the centre of the lathe axis, wherein the centre of rotation of the object relative to the centre of the lathe may be displaced steplessly and biaxially, according to a predetermined calculation, without removing the object from the chuck.

18 Claims, 4 Drawing Sheets

(56) References Cited

U.S. PATENT DOCUMENTS

| | | | | | |
|---|---|---|---|---|---|
| 2,771,297 | A | * | 11/1956 | Nipken | ................ B23B 31/208 |
| | | | | | 82/155 |
| 3,037,409 | A | * | 6/1962 | Hare | ................... B23B 31/0261 |
| | | | | | 82/170 |
| 3,685,845 | A | | 8/1972 | Fischer et al. | |
| 5,471,900 | A | * | 12/1995 | Corwin | ................ B23Q 39/048 |
| | | | | | 82/47 |
| 5,711,196 | A | * | 1/1998 | Reid | .................... B24B 41/067 |
| | | | | | 451/384 |

FOREIGN PATENT DOCUMENTS

| | | | | |
|---|---|---|---|---|
| CN | 108687556 A | | 10/2018 | |
| DE | 2707418 A | * | 8/1978 | ............. B23B 31/36 |
| DE | 3417641 A | * | 11/1985 | ........... B23B 31/026 |
| DE | 19531104 A1 | | 2/1997 | |

OTHER PUBLICATIONS

PCT Written Opinion for PCT Application No. PCT/FI2020/050270 mailed Aug. 17, 2020 (5 pages).

\* cited by examiner

ARRANGEMENT FOR PROVIDING CENTRE DISPLACEMENT IN A MACHINE TOOL

CROSS-REFERENCE TO RELATED APPLICATIONS

This application is a National Stage Application of PCT/FI2020/050270, filed 24 Apr. 2020, which claims benefit of Ser. No. 20/190,029, filed 24 Apr. 2019 in Finland, and which applications are incorporated herein by reference. To the extent appropriate, a claim of priority is made to each of the above disclosed applications.

BACKGROUND

The invention relates to an arrangement for providing centre displacement in a machine tool.

Centre displacement or workpiece centring is in many manufacturing processes an essential work stage. Examples include hollow cylindrical structures of a circular cross-sectional profile, which are most often manufactured by rolling from a sheet blank. This manufacturing method is used e.g. in the manufacture of cable drums for hoists. In the rolling process the ends of the blank are not rolled to the curvature of the rest of the drum but remain straight. Due to this error in shape, the blank may preferably be set in the turning process to rotate about a centre different from the geometrical centre of the blank, by setting the blank to rotate eccentrically for machining. Thereby the amount of machined material may be minimized and material strength in the complete drum may be fully predetermined. Centre displacement turning brings an economic advantage due to shortened machining times and uniform quality of the products.

It is known to fasten a blank onto a lathe or the like eccentrically using a four-jaw chuck which is characterized in that the jaws of the chuck are separately adjustable and centre displacement of the workpiece is performed by moving all jaws of the chuck. With a four-jaw chuck, centre displacement may be carried out biaxially. The problem is that changing the centre displacement of a blank using a four-jaw chuck is difficult and time-consuming, and fastening of the workpiece does not remain stable.

Short Description

The arrangement according to the invention is characterized by features presented in the independent claim. Other embodiments of the invention are characterized by features presented in other claims.

Inventive embodiments are also presented in the description and drawings of this application. The inventive content of the application may also be defined differently from the claims presented below. The inventive content may also consist of several separate inventions, especially if the invention is considered in light of the disclosed or implicit substeps or in terms of achieved advantages or categories of advantages. In this case, some features included in the claims presented below may be unnecessary in terms of different inventive ideas. Features of the different implementations of the invention may, within the scope of the basic inventive idea, be applied in connection with other implementations.

The invention relates to fastening an object onto a machine tool, specifically a lathe. The invention provides an alternative method for adjusting the location of the centre of rotation of the object. By means of the invention the extent of centre displacement is adjusted by changing the relative rotation between parts of the device fitted together to rotate eccentrically. With the invention an object to be fastened may be positioned to rotate in a machine tool and a desired biaxial centre displacement may be set.

In summary, it may be stated that the arrangement according to the invention is characterized in that
it comprises:
a fastening element for receiving a workpiece or a tool means,
a body for fastening the fastening element onto a machine tool, which body comprises a body outer rim shaped as the circumference of a circle,
a first centre displacement section,
a second centre displacement section, which centre displacement sections are arranged between the fastening element and the body to connect the fastening element with the body, which first centre displacement section comprises
a first inner rim shaped as the circumference of a circle and rotatably arranged onto the body outer rim,
a first outer rim shaped as the circumference of a circle and arranged eccentrically relative to the first inner rim, such that their centre points are not aligned, and
a first aperture which passes through the first centre displacement section and is concentric with the first inner rim, and which
second centre displacement section comprises
a second inner rim shaped as the circumference of a circle and rotatably arranged onto the first outer rim,
fastening element fastening means which are configured to fasten the fastening element to the second centre displacement section eccentrically relative to the second inner rim, and
a second aperture which passes through the second centre displacement section, which arrangement further comprises
an end flange which is sized larger than the second aperture and is provided between the second centre displacement section and the fastening element, and
a pressure medium operated actuator which is coupled via the first and the second aperture to the end flange, such that
in a first mode of the actuator the end flange is located farther from the body, such that the centre displacement sections are rotatable relative to each other and to the body, and that
in a second mode of the actuator the end flange is located closer to the body, the centre displacement sections being thereby locked relative to each other and to the body.

The advantage is that biaxial centre displacement may be performed without loosening the grip on the object. The direction and extent of the centre displacement may be calculated in advance.

In the following, features of some implementations of the invention are listed in a random order:

The idea of one embodiment is that the body has a front wall which is configured to be elastically bendable by the effect of pressure of a pressure medium and arranged to operate as a part of the pressure medium operated actuator. The advantage is that a simple and leakproof structure may be provided.

The idea of one embodiment is that the front wall comprises at least one groove for facilitating the movement of the front wall. The advantage is that by means of the groove the stress on the material surface can be reduced so as to provide conditions where stress on the front wall causes stretching of the material instead of bending.

The idea of one embodiment is that the body forms a pressure chamber which is configured to hold a pressure medium and which chamber operates as said pressure medium operated actuator, the pressure of the pressure medium being arranged to bend the front wall. The advantage is that a simple and compact structure may be provided.

The idea of one embodiment is that the pressure chamber comprises a connector to be coupled with a pressure source external to the chamber. The advantage is that the structure of the arrangement can be simplified.

The idea of one embodiment is that the pressure needed for moving the end flange is generated in the chamber. The advantage is that the arrangement does not need an external pressure source.

The idea of one embodiment is that a screw hole and a matching screw plug are arranged in connection with the pressure chamber, which screw plug is turned towards the chamber in order to increase pressure in the chamber. The advantage is that the pressure increase may be provided in a very simple way.

The idea of one embodiment is that the actuator is in its first mode when the front wall is forced by the effect of pressure of the pressure medium to bend towards the fastening element, and in its second mode when the front wall is in its rest mode. The advantage is that when the arrangement is locked and thereby ready for machining, the pressure of the arrangement is low and its use is safe.

The idea of one embodiment is that the arrangement comprises a hydraulic cylinder which is arranged to bend the front wall. The advantage is that the structure of the arrangement can be lightened, and that a possibly existing actuator of the machine tool may be utilized.

The idea of one embodiment is that a back wall of the pressure chamber is bendable and that the arrangement comprises a second actuator which is arranged to act on said back wall.

The idea of one embodiment is that the end flange is provided with a drive pin which extends through the first aperture and the second aperture and is coupled to the front wall to move with the front wall. The advantage is that the movement of the front wall can be transmitted in a simple way and without play to the end flange.

The idea of one embodiment is that the arrangement comprises a hydraulic cylinder which is coupled to the end flange for moving the end flange. The advantage is that a very simple structure may be provided.

The idea of one embodiment is that the arrangement comprises more than two centre displacement sections. The advantage is that the extent and/or accuracy of centre displacement may be increased.

The idea of one embodiment is that the fastening element is centrable along the centre line of the arrangement. The advantage is that machining may be performed symmetrically relative to the geometrical centre point.

The idea of one embodiment is that the pressure medium comprises liquid. The advantage is that liquid is substantially incompressible, so pressure can be transmitted substantially efficiently.

The idea of one embodiment is that the fastening element is intended for fastening a workpiece to a machine tool. The advantage is that the workpiece may be machined eccentrically.

The idea of one embodiment is that the fastening element is intended for fastening a tool. The advantage is that the tool may be moved eccentrically.

SHORT DESCRIPTION OF THE FIGURES

The invention is explained in more detail in the accompanying drawings, in which FIG. 1 schematically illustrates one arrangement for providing centre displacement in a machine tool as an exploded perspective view, FIG. 2*a* schematically illustrates the arrangement of FIG. 1 as seen in the direction of the chuck, FIG. 2*b* schematically illustrates the arrangement of FIG. 1 as seen from the side, FIG. 2*c* schematically illustrates a cross-section of the arrangement of FIG. 1 as seen from the side, FIG. 3*a* schematically illustrates the arrangement of FIG. 1 as seen in the direction of the chuck with one centre displacement completed, FIG. 3*b* schematically illustrates the arrangement of FIG. 1 as seen in the direction of the chuck with the centre centred, and FIG. 4 schematically illustrates another arrangement for providing centre displacement as a partially cross-sectional side view.

In the figures the subject matter is illustrated in a simplified form for the purpose of clarity. Like parts are indicated in the figures using the same reference signs.

DETAILED DESCRIPTION

Figure 1:
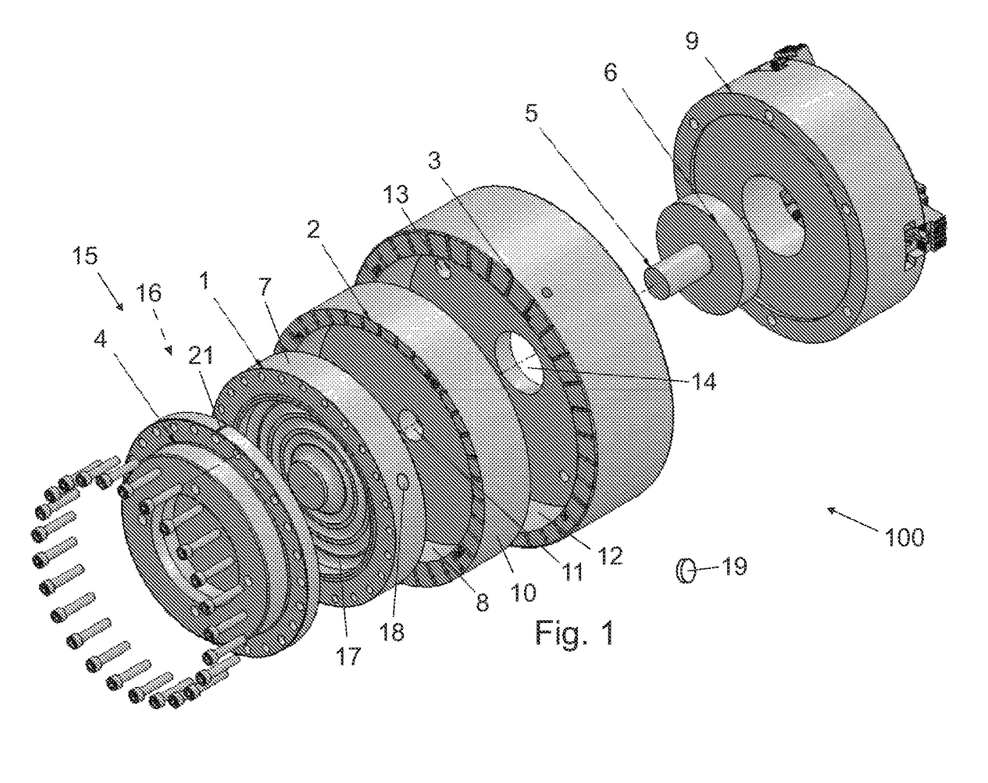
Figure 2A:
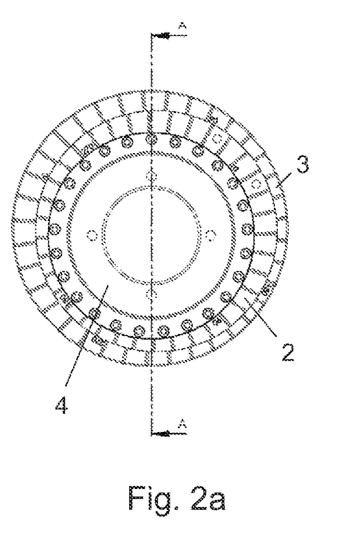
Figure 2B:
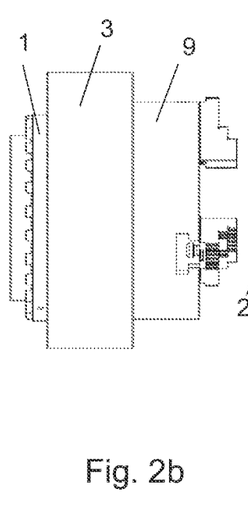
Figure 2C:
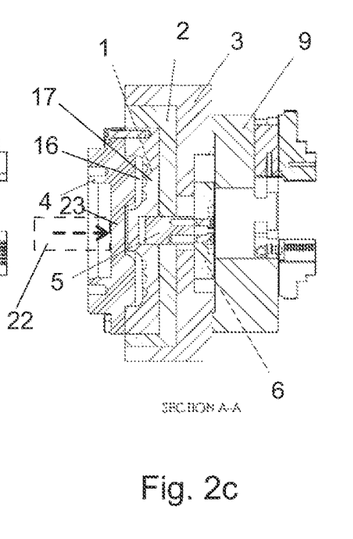
Figure 3A:
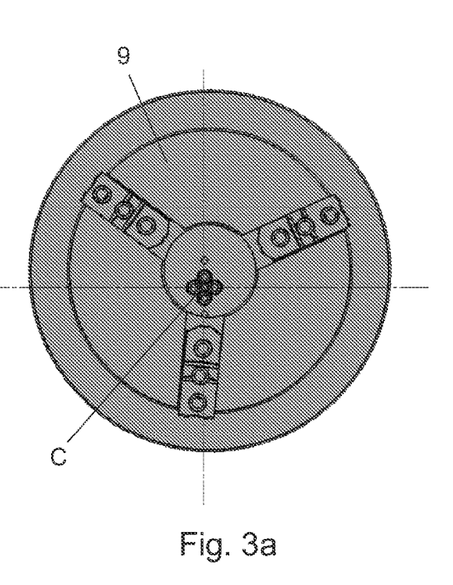
Figure 3B:
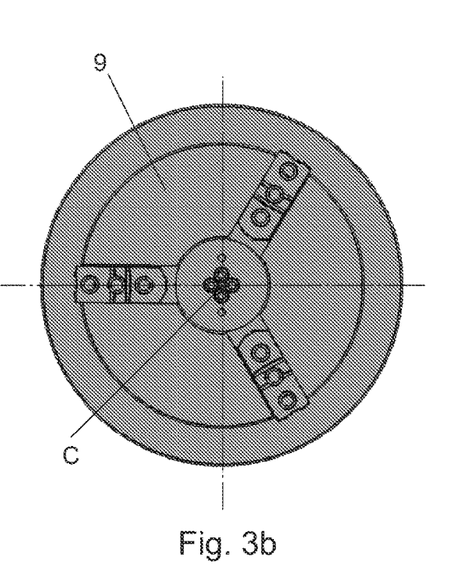

FIG. 1 schematically illustrates one arrangement for providing centre displacement in a machine tool as an exploded perspective view, FIG. 2*a* is a schematic view as seen in the direction of the chuck, FIG. 2*b* is a schematic view as seen from the side, FIG. 2*c* is a schematic cross-sectional view as seen from the side, FIG. 3*a* illustrates one centre displacement completed as seen in the direction of the chuck, and FIG. 3*b* illustrates the centre centred as seen in the direction of the chuck.

The arrangement 100 comprises a fastening element 9 to which a workpiece or a tool means is fastened, and a body 1 for fastening the fastening element 9 to a machine tool. The body 1 comprises a body outer rim 7 shaped as the circumference of a circle.

In one embodiment the machine tool is a lathe, a lathe-mill or a machining centre.

In one embodiment the fastening element 9 is arranged for fastening a workpiece onto a machine tool. In another embodiment the fastening element 9 is arranged for fastening a tool. Said tool may be for example a subtractive tool, an additive tool, or a forming tool.

In one embodiment the fastening element 9 is a chuck body. In a second embodiment the fastening element 9 is a fastening plate, such as a bolt plate. In a third embodiment the fastening element 9 is a lathe centre.

The arrangement 100 comprises a first centre displacement section 2 and a second centre displacement section 3, which centre displacement sections are arranged between the fastening element 9 and the body 1 to connect the fastening element 9 with the body 1.

The first centre displacement section 2 comprises a first inner rim 8 shaped as the circumference of a circle and rotatably arranged onto the body outer rim 7. Said first centre displacement section 2 further comprises a first outer rim 10 shaped as the circumference of a circle and arranged eccentrically relative to the first inner rim 8, such that their centre points are not aligned. The first centre displacement section 2 also comprises a first aperture 11 which passes through the first centre displacement section 2 and is concentric with the first inner rim 8.

The second centre displacement section 3 comprises a second inner rim 12 shaped as the circumference of a circle and rotatably arranged onto the first outer rim 10, fastening element fastening means 13 which are configured to fasten the fastening element 9 to the second centre displacement section 3 eccentrically relative to the second inner rim 12, and a second aperture 14 which passes through the second centre displacement section 3.

In one embodiment, such as in the embodiment illustrated in FIG. 1, the centre displacement sections 2 and 3 are machined in such a way that the centre points of their outer rim and inner rim are not aligned, centre displacement being thereby provided by changing the angle of rotation between the body 1, the first centre displacement section 2 and the second centre displacement section 3 with respect to one another.

When the arrangement 100 is in a position where centre displacement is zero (as illustrated in FIG. 3b), the centre axes of a fastening plate 4 and the fastening element 9 are aligned.

The arrangement 100 further comprises an end flange 6 which is sized larger than the second aperture 14 and is provided between the second centre displacement section 3 and the fastening element 9, where it is able to move in the direction of the second centre displacement section 3 and back.

The arrangement 100 includes a pressure medium operated actuator 15 which is coupled via the first and the second aperture 11, 14 to the end flange 6. In one embodiment, such as in the embodiment illustrated in FIG. 1, the end flange 6 is provided with a drive pin 5 which extends through the first aperture 11 and the second aperture 14 and is coupled to a front wall 17 to move with the front wall.

The actuator 15 operates in two modes; in a first mode the end flange 6 is located farther from the body 1, such that the centre displacement sections 2, 3 are rotatable relative to each other and to the body 1. In a second mode of the actuator 15 the end flange 6 is located closer to the body 1, such that it clamps the centre displacement sections 2, 3 against each other such that they are locked relative to each other, also clamping the first centre displacement section 2 against the body 1, the centre displacement sections 2, 3 and the body 1 thereby forming a locked assembly.

According to one idea the smallest clamping force $F_n$ for clamping the centre displacement sections 2, 3 and the body 1 is calculated using the following formula:

$$F_n = \frac{T_k}{\mu * r_k * i}$$

wherein
$T_k$=torque transmitted by centre displacement device
$\mu$=coefficient of friction between centre displacement sections
$r_k$=mean radius of friction surfaces of centre displacement sections
i=number of centre displacement section pairs In one embodiment, such as in the embodiment illustrated in FIG. 1, the body 1 forms a pressure chamber 16 which is configured to hold a pressure medium and which chamber operates as the pressure medium operated actuator 15. The body 1 has a front wall 17 which is configured to be elastically bendable by the effect of pressure of the pressure medium and arranged to operate as a part of the pressure medium operated actuator 15. The front wall 17 operates in the manner of a diaphragm spring which is bent within its yield limits, such that when the bending force is withdrawn the front wall 17 returns to its earlier shape. The material of the front wall 17 is preferably strong and tough. In one embodiment the front wall 17 is manufactured from quenched and tempered steel, such as from steel 34CrNiMo6.

In one embodiment, such as in the embodiment illustrated in FIG. 1, the actuator 15 is in its first mode when the front wall 17 is forced by the effect of pressure of the pressure medium in the chamber 16 to bend towards the fastening element 9, and in its second mode when the front wall is 17 in its rest mode. When the front wall 17 is bent, the end flange 6 moves away from the body 1 and the first centre displacement section 2, the second centre displacement section 3 and the body 1 are released from clamping between the body 1 and the end flange 6. Then the centre displacement sections 2 and 3 are able to rotate relative to the body 1. On the other hand, when said pressure is released, the end flange 6 moves towards the body 1 and the arrangement is locked.

In another embodiment the operation is reversed, in other words, the arrangement 100 is locked when there is pressure in the chamber and released when the pressure in the chamber is released.

Centre displacement of the fastening element 9 is provided from the angle of rotation ratio between the centre displacement sections 2, 3 and the body 1 with respect to one another, because the inner and outer rims 8, 10 of the first centre displacement section are eccentric and because the fastening element 9 is fastened eccentrically to the second centre displacement section 3.

In one embodiment the extent and direction of centre displacement may be read from the centre displacement sections 2, 3 by means of an indicator 21 arranged on the fastening plate 4.

In one embodiment the centre displacement sections 2 and 3 are sized relative to each other in such a way that the fastening element 9 is centrable along the centre line of the arrangement.

The front wall 17 may comprise at least one groove/reduction which facilitates the elastic deformation of the front wall 17. In the embodiment illustrated in FIG. 1 the front wall 17 has grooves of a semi-circular cross-section made for example by turning to increase bendability of the front wall 17.

In one embodiment, such as in FIG. 1, the pressure chamber 16 is formed from parts bolted together. In another embodiment the structure of the pressure chamber 16 is formed by welding.

The front wall 17 is bent by increasing the pressure of the pressure medium in the pressure chamber 16. In one embodiment the pressure medium comprises liquid, for example hydraulic oil. In a second embodiment the pressure medium comprises gas. In a third embodiment the pressure medium comprises a non-liquid medium, such as silicone, which transmits pressure in the chamber in the manner of a liquid. The advantage of a non-liquid medium is leakproofness.

In one embodiment the pressure chamber 16 comprises a connector to be coupled with a pressure source external to the chamber, the necessary pressure of the pressure medium being thereby generated outside the arrangement 100.

In another embodiment the pressure needed for moving the end flange 6 is generated in the chamber 16. This may be accomplished for example with a screw hole 18 arranged in connection with the pressure chamber 16 and a matching screw plug 19, and by using a pressure liquid as the pressure medium. When the screw plug 19 is turned towards the pressure chamber 16, the volume of the chamber is reduced and the substantially incompressible pressure liquid transmits the necessary pressure to the front wall 17.

In one embodiment the arrangement 100 comprises a hydraulic cylinder (not illustrated in the figure) which is arranged to bend the front wall 17.

In one embodiment the arrangement 100 comprises more than two centre displacement sections. According to one idea, the extent of circumferential displacement may be increased by adding a third centre displacement section. According to one idea, the extent of circumferential displacement and/or the accuracy of circumferential displacement may be increased by adding a third and a fourth centre displacement section. Accuracy may be particularly preferably increased by using at least four centre displacement sections and by setting the eccentricity of the third and the fourth centre displacement section unequal to the eccentricity of the first and the second centre displacement section.

FIG. 2c illustrates by dashed line a second actuator 22 of one implementation of the system, which may be for example a hydraulic cylinder. Further, a back wall 23 of the pressure chamber is bendable. The second actuator 22 is configured to bend the back wall 23 or part of it. According to one idea, the force or movement of the front wall 17 may be increased by selecting an advantageous ratio for the deformable surface areas of the back wall and the front wall. For example, the force generated by the front wall 17 may be increased if the deformable surface area of the back wall 23 is smaller than the corresponding surface area of the front wall 17.

Figure 4:
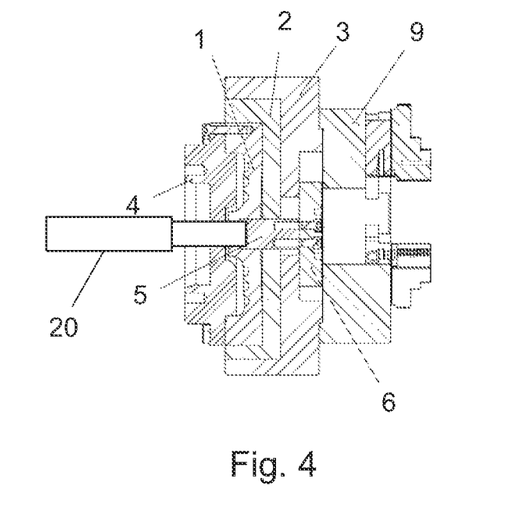

FIG. 4 schematically illustrates another arrangement for providing centre displacement as a partially cross-sectional side view. According to one idea the arrangement comprises a hydraulic cylinder 20 which is coupled to the end flange 6 for moving the end flange. In the embodiment illustrated in FIG. 4 the hydraulic cylinder 20 couples to the end flange 6 by means of a drive pin 5, but this is not necessary.

By operating the hydraulic cylinder 20 the end flange 6 can be clamped towards the body 1 so as to lock the arrangement, and reversely the end flange 6 can be moved towards the fastening element, the arrangement thereby being released so the centre displacement may be changed.

In some cases the features presented in this application may be used as such, disregarding other features. On the other hand, the features presented in this application may be combined if necessary to form different combinations.

The drawings and the description related to the drawings are only intended to illustrate the idea of the invention. It is obvious for a person skilled in the art that the invention is not limited to the above-given embodiments which describe the invention by way of some examples, but many modifications and different applications of the invention are possible within the scope of the inventive idea defined by the claims presented hereinafter.

REFERENCE SIGNS 1 body
2 1st centre displacement section
3 2nd centre displacement section
4 fastening plate
5 drive pin
6 (drive pin) end flange
7 body outer rim
8 first inner rim
9 fastening element
10 first outer rim
11 first aperture
12 second inner rim
13 fastening element fastening means
14 second aperture
15 actuator
16 chamber
17 front wall
18 screw hole
19 screw plug
20 hydraulic cylinder
21 indicator
22 second actuator
23 back wall
100 arrangement
C centre

The invention claimed is:

1. An arrangement for providing centre displacement in a machine tool, which arrangement comprises:
  A) a fastening element for receiving a workpiece or a tool means,
  B) a body for fastening the fastening element onto the machine tool, which body comprises a body outer rim shaped as the circumference of a circle,
  C) a first centre displacement section,
  D) a second centre displacement section, which centre displacement sections are arranged between the fastening element and the body to connect the fastening element with the body,
  E) which first centre displacement section comprises:
    i) a first inner rim shaped as the circumference of a circle and rotatably arranged onto the body outer rim,
    ii) a first outer rim shaped as the circumference of a circle and arranged eccentrically relative to the first inner rim, such that their centre points are not aligned, and
    iii) a first aperture which passes through the first centre displacement section and is concentric with the first inner rim,
  F) and which second centre displacement section comprises;
    i) a second inner rim shaped as the circumference of a circle and rotatably arranged onto the first outer rim,
    ii) fastening element fastening means which are configured to fasten the fastening element to the second centre displacement section eccentrically relative to the second inner rim, and
    iii) a second aperture which passes through the second centre displacement section, which arrangement further comprises:
  G) an end flange which is sized larger than the second aperture and is provided between the second centre displacement section and the fastening element, and
  H) a pressure medium operated actuator which is coupled via the first and the second aperture to the end flange, such that
  I) in a first mode of the actuator the end flange is located farther from the body, such that the centre displacement sections are rotatable relative to each other and to the body, and that J) in a second mode of the actuator the end flange is located closer to the body, the centre displacement sections being thereby locked relative to each other and to the body.

2. The arrangement according to claim 1, wherein the body has a front wall which is configured to be elastically bendable by the effect of pressure of a pressure medium and arranged to operate as a part of the pressure medium operated actuator.

3. The arrangement according to claim 2, wherein the front wall comprises at least one groove for facilitating the movement of the front wall.

4. The arrangement according to claim 2, wherein the body forms a pressure chamber which is configured to hold a pressure medium and which chamber operates as said pressure medium operated actuator, the pressure of the pressure medium being arranged to bend the front wall.

5. The arrangement according to claim 4, wherein the pressure chamber comprises a connector to be coupled with a pressure source external to the chamber.

6. The arrangement according to claim 4, wherein the pressure needed for moving the end flange is generated in the chamber.

7. The arrangement according to claim 6, wherein a screw hole and a matching screw plug are arranged in connection with the pressure chamber, which screw plug is turned towards the chamber in order to increase pressure in the chamber.

8. The arrangement according to claim 4, wherein a back wall of the pressure chamber is bendable and that the arrangement comprises a second actuator which is arranged to act on said back wall.

9. The arrangement according to claim 2, wherein the actuator is in its first mode when the front wall is forced by the effect of pressure of the pressure medium to bend towards the fastening element, and in its second mode when the front wall is in its rest mode.

10. The arrangement according to claim 2, which comprises a hydraulic cylinder which is arranged to bend the front wall.

11. The arrangement according to claim 2, wherein the end flange is provided with a drive pin which extends through the first aperture and the second aperture and is coupled to the front wall to move with the front wall.

12. The arrangement according to claim 1, which comprises a hydraulic cylinder which is coupled to the end flange for moving the end flange.

13. The arrangement according to claim 1, which comprises more than two centre displacement sections.

14. The arrangement according to claim 1, wherein the centre displacement sections are sized relative to one another in such a way that the fastening element is centrable along the centre line of the arrangement.

15. The arrangement according to claim 1, wherein the pressure medium comprises liquid.

16. The arrangement according to claim 1, wherein the fastening element is intended for fastening a workpiece to the machine tool.

17. The arrangement according to claim 1, wherein the fastening element is intended for fastening a tool.

18. The arrangement according to claim 1, wherein the machine tool is a lathe, a lathe-mill, or a machining centre.

* * * * *